United States Patent
Eve (10) Patent No.: US 6,885,636 B1
(45) Date of Patent: Apr. 26, 2005

(54) TELECOMMUNICATIONS NETWORK (75) Inventor: Berridge A R Eve, Felixstowe (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/601,881

(22) PCT Filed: Mar. 9, 1999

(86) PCT No.: PCT/GB99/00700
§ 371 (c)(1),
(2), (4) Date: Aug. 9, 2000

(87) PCT Pub. No.: WO99/46941
PCT Pub. Date: Sep. 16, 1999

(30) Foreign Application Priority Data

Mar. 9, 1998 (EP) ............................................. 98301726

(51) Int. Cl.[7] ............................... H04J 3/14; H04J 1/16
(52) U.S. Cl. ...................................... 370/228; 370/227
(58) Field of Search .................................. 370/225–228, 370/236, 241, 242, 244, 248, 252; 379/221.03, 221.04, 221.05, 221.06, 279; 714/1, 2

(56) References Cited

U.S. PATENT DOCUMENTS

| | | | | |
|---|---|---|---|---|
| 5,712,847 A | * | 1/1998 | Hata | 370/228 |
| 5,761,245 A | * | 6/1998 | Haukkavaara et al. | 375/267 |
| 5,870,382 A | * | 2/1999 | Tounai et al. | 370/220 |
| 5,901,024 A | * | 5/1999 | Deschaine et al. | 361/67 |
| 5,959,972 A | * | 9/1999 | Hamami | 370/228 |

* cited by examiner

Primary Examiner—Ajit Patel
(74) Attorney, Agent, or Firm—Nixon & Vanderhye P.C.

(57) ABSTRACT

Telecommunications Network In a telecommunications network, a level of redundancy is often provided so that in the event of a circuit failure a back-up route may be used. A telecommunications network in which automatic switching of telecommunications traffic to back-up circuits is disclosed herein when faults are detected on a traffic carrying circuit. In particular, when dedicated private circuits develop faults, a network automatically switches traffic to a dedicated back-up circuit. Particular points on incoming and outgoing circuits of a switch are monitored. Faults at particular points result in autonomous switching of traffic to a dedicated back-up circuit. Communication is facilitated between switches by using predetermined signals on the dedicated back-up circuit.

26 Claims, 5 Drawing Sheets

TELECOMMUNICATIONS NETWORK

BACKGROUND

1. Field of the Invention

This invention relates to a telecommunications network and in particular to such a network including back-up circuits. In a telecommunications network a level of redundancy is often provided so that in the event of a circuit failure a back-up route may be used. This invention relates to a telecommunications network in which automatic switching of telecommunications traffic to backup circuits is provided when faults are detected on a traffic carrying primary circuit. In particular, when dedicated private circuits develop faults, this invention provides a network in which automatic switching of traffic to a dedicated back-up circuit takes place. This invention also relates to methods of automatically switching traffic to a back-up route in the event of a circuit failure.

2. Description of Related Art

In a network requiring protection using back-up circuits, each circuit is monitored within an exchange using a conventional test apparatus, sometimes referred to as an In Service Monitoring Network Element (ISMNE), which is connected to various monitor points on a circuit. Each test apparatus generates an alarm when certain error conditions are detected. Each test apparatus is monitored centrally by a Transmission Network Surveillance system (TNS). When alarms indicate that a traffic carrying circuit has failed, a central restoration co-ordinator determines that errors detected by two test apparatus correspond to a particular traffic bearing circuit and the traffic is switched onto a back-up circuit.

The problem with using such a centralized restoration process is that it can take some time for the alarms to be sent to the centralized processor, the alarms to be interpreted and commands to be sent to the exchanges to switch traffic to a backup circuit. Clearly, once a circuit has failed, a customer using that circuit has no service until traffic is switched to a back-up circuit. If a technique can be used which allows each exchange to autonomously switch traffic from a failed primary circuit to a back-up circuit, then the time for which the customer loses service can be considerably reduced.

BRIEF SUMMARY OF ASPECTS OF THE INVENTION

According to a first aspect of the present invention there is provided a telecommunications network comprising a plurality of switching nodes interconnected by a plurality of circuits, each circuit comprising a respective forward transmission path and a respective reverse transmission path;

telecommunications traffic signals being transmitted by a switching node from an incoming circuit to another of said switching nodes on a primary circuit of said plurality of circuits;

each of said switching nodes including monitoring means for monitoring signals on said circuits, the monitoring means being responsive to detection of a fault on said primary circuit to cause said telecommunications traffic to be transmitted on a second of said circuits;

signal generating means for generating a predetermined signal pattern on the forward transmission path of the second of said plurality of circuits; and means to inhibit switching of traffic between said primary circuit and said second of said circuits if the predetermined signal pattern is not detected on the reverse transmission path of the second circuit.

Using this invention traffic is switched from a primary circuit to a back-up circuit autonomously depending on the status of locally monitored signals. The test apparatus at one end of a traffic bearing circuit cannot directly communicate with the test apparatus at the other end of a traffic bearing circuit as they are not directly connected to each other. In this invention such communication effectively takes place via signals on the back-up circuit. Switching takes place in dependence upon the status of local monitor points including the status of a monitor point on the back-up circuit. Switching of traffic to the back-up circuit is inhibited if the status of the local monitor points indicates that a fault is somewhere other than on the traffic bearing circuit.

In one embodiment of the invention the predetermined pattern is not transmitted if fault conditions are detected on the forward transmission path of the incoming circuit.

In another embodiment of the invention the predetermined pattern is not transmitted if fault conditions are detected on the reverse transmission path of the second circuit.

The inhibiting means may be further arranged to inhibit such switching if the predetermined pattern is not being transmitted.

The monitoring means may be further arranged to be responsive to detection of telecommunications traffic on said second circuit, to cause telecommunications traffic to be transmitted on said second of said circuits.

The inhibiting means may be further arranged to inhibit switching of telecommunications traffic unless detected telecommunications traffic is preceded by said predetermined pattern signal.

Additionally the monitoring means may be further arranged to be responsive to detection of said predetermined pattern signal followed by telecommunications traffic on said second circuit, to cause telecommunications traffic to be transmitted on said second of said circuits.

According to a second aspect of the present invention, there is provided a method of restoration control in a communications network in which at least some primary circuits are associated with respective back-up circuits, the method comprising the steps of:— continuously monitoring both ends of a back-up circuit for the presence of a fault condition, and, while a fault condition is detected at a said end;

preventing, at said end, the switching of traffic from the associated primary circuit to the back-up circuit.

Preferably, the step of continuously monitoring both ends of a back-up circuit for the presence of a fault condition comprises continuously monitoring said ends for the correct receipt of a test signal, and, while the correct receipt of a test signal is not detected at a said end;

preventing, at said end, the switching of traffic from the associated primary circuit to the back-up circuit.

BRIEF DESCRIPTION OF THE DRAWINGS

A telecommunications network in accordance with the invention will be described, by way of example only, with reference to the accompanying drawings in which:—

DETAILED DESCRIPTION OF EXEMPLARY EMBODIMENTS

Figure 1:
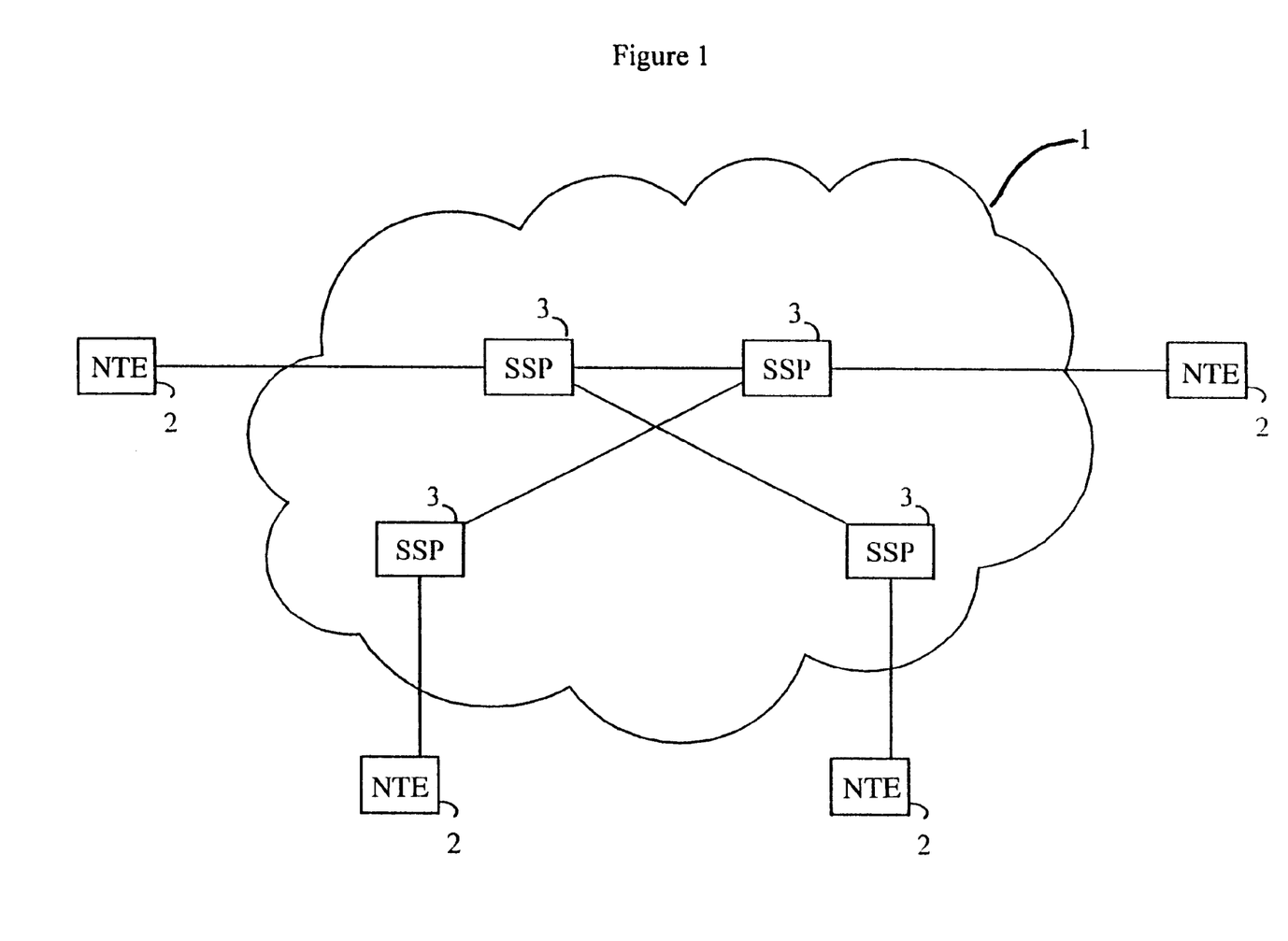
FIG. 1 shows a schematic diagram of an example of a telecommunications network.

In FIG. 1 there is shown a plurality of network terminating equipments (NTE) 2 connected to a fully interconnected high speed digital telecommunications network comprising a plurality of service switching points (SSP) 3, also known as switching nodes, and arranged to carry traffic in accordance with the transmission protocol known as Plesiochronous Digital Hierarchy (PDH). The network 1 is a global network, and the SSPs 3 are situated in respective countries. The transmission links interconnecting the SSPs 3 are shown as single hop links, but in practice will involve intermediate networks, such as network 36 of FIG. 2.

Figure 2:
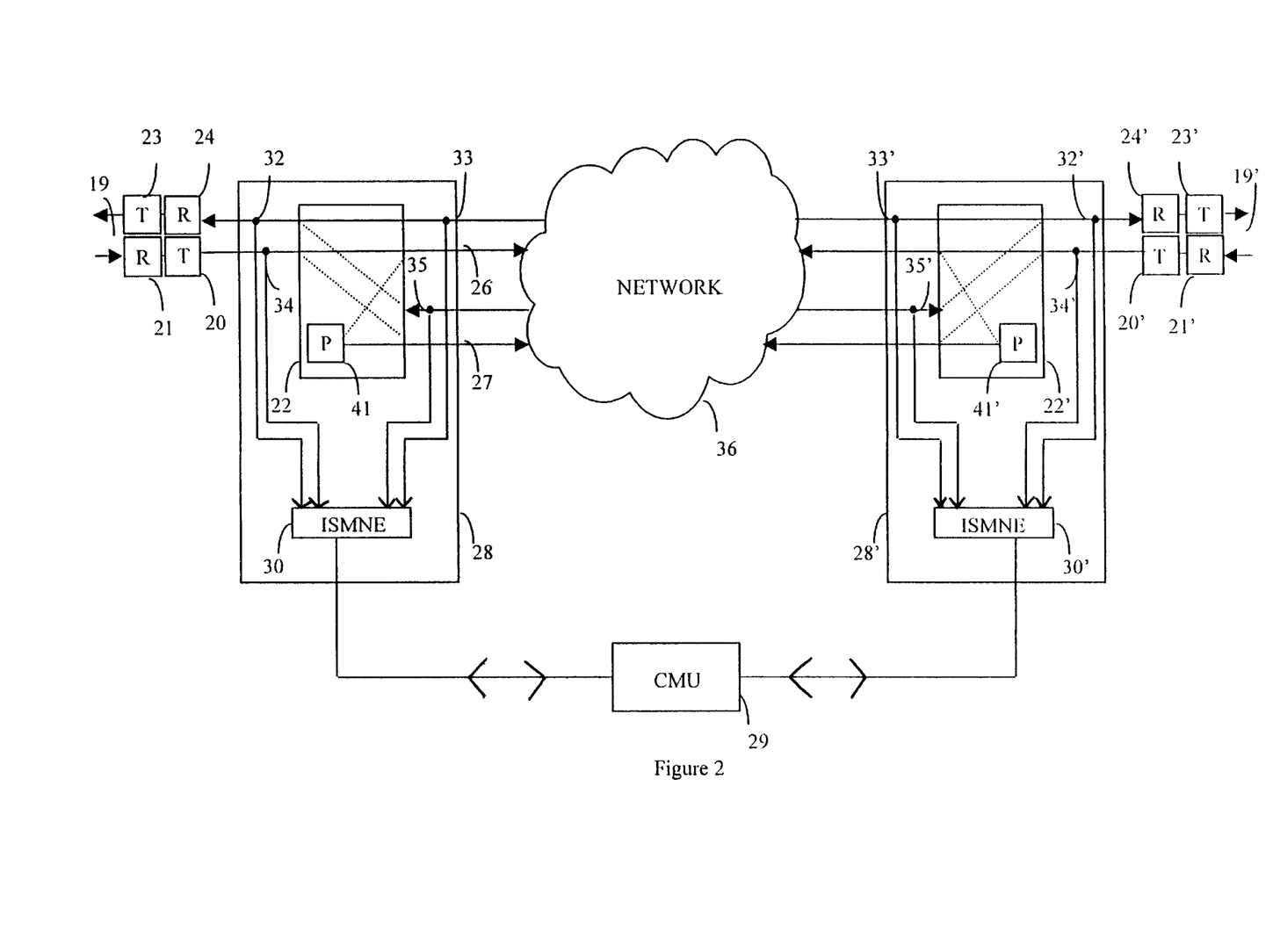
FIG. 2 shows a schematic diagram of two of the exchanges of FIG. 1 showing interconnection thereof.

FIG. 2 shows two SSPs 3 in the form of exchanges 28, 28', interconnected by a two-way primary circuit 26 and a two-way secondary, i.e. back-up, circuit 27, via a transmission network 36. At the exchange 28, a primary circuit 19, forming part of a transmission link between exchange 28 and a preceding exchange (not shown), is terminated by a receiver 21 and a transmitter 23. The output of the receiver 21 is connected to the input of an associated transmitter 20, and the input of transmitter 23 is connected to the output of an associated receiver 24.

The transmitter 20 and the receiver 24 are connected via a switch 22 of the exchange 28 to the two-way primary circuit 26, and, similarly, at the exchange 28', a transmitter 20' and a receiver 24' are connected via a switch 22' of the exchange 28' to the two-way primary circuit 26. Associated receiver 21' and transmitter 23' are connected to a primary circuit 19' forming part of a transmission link between exchange 28' and a following exchange (not shown). Such primary and secondary circuits are constituted by allocated timeslots in a time division multiplexed digital highway forming part of a higher order transmission scheme, as is known in the art. The respective switches 22, 22' enable traffic signals from the transmitters 20, 20' to be switched between the primary circuit 26 and the secondary circuit 27. Respective pattern generators (P) 41, 41' are connected to the secondary circuit 27. When switching takes place to connect the transmitters 20, 20' and the receivers 24, 24' to the secondary circuit 27 the pattern generators 41 are connected to the primary circuit 26. Instead of the circuit 19, 19' being part of an inter-SSP link, it can be the or part of the link from an NTE 2.

In normal operation, traffic signals from the transmitter 20 are transmitted through the switch 22, then via the primary circuit 26 though the transmission network 36, through the switch 22' to the corresponding receiver 24'. The operation of the forward path of the primary circuit 26, with respect to the exchange 28, is monitored using a non-intrusive teepiece at monitor point 34 at the exchange 28 and similarly at monitor points 32' and 33' at the exchange 28'. Similarly, the operation of the other path of the primary circuit 26, with respect to the exchange 28, is monitored at monitor point 34' at the exchange 28' and at monitor points 32 and 33 at the exchange 28. The pattern generator 41 generates a predetermined data pattern of all zeros, which is transmitted through the switch 22 via the secondary circuit 27 through the transmission network 36 to the exchange 28'. The operation of the secondary circuit 27 is monitored at a monitor point 35 at the exchange 28 at the incoming end of the reverse path of the secondary circuit 27 and at a corresponding monitor point 35' at the exchange 28', at the far end of the forward path of the secondary circuit 27, i.e. with respect to the exchange 28.

Each exchange 28, 28' contains a respective test apparatus 30, 30' which is connected to its exchange monitor points 32, 33, 34 and 35, (32', 33', 34' and 35'). The test apparatus 30, 30' can detect various conditions of a monitored signal. These include Loss of Signal (LOS), Alarm Indication Signal (AIS), Excessive Error Threshold exceeded (EET), Loss of Frame Alignment (LFA) and receipt of a data signal having the predetermined pattern.

The test apparatus 30, 30' are connected to a Central Management Unit (CMU) 29. This connection is shown in FIG. 2 as being direct, but in practice is via the public switched telephone network. Data relating to the performance of the exchange and the status of the monitor points is transmitted to the CMU at intervals, for example every 15 minutes. If the status of any of the monitor points indicates a fault condition then an alarm condition is reported to the CMU. To minimize the amount of data transmitted, only the highest priority alarm is reported for any one event. Not all conditions detected at the monitor points necessarily generate alarms, some are simply recorded for later analysis.

The conditions which are used in this invention are now described more fully. Loss of Signal is detected when the signal level becomes very low, for example, when the detected signal has a signal level of less than or equal to a signal level of 35 dB below nominal. Alarm Indication Signal is detected on the receipt of a predetermined alarm signal, for example, all ones, which is generated by NTEs 2 when a local fault is detected. Receipt of such a predetermined alarm signal indicates that there is a fault elsewhere in the telecommunications network, i.e. not at the exchange 28. In the PDH, traffic signals are formatted into sequences of frames which commonly comprise a predetermined header part prepended to an information data part. Commonly, one or more parity bits are appended to the information data part. An errored frame may be detected, for example, if there are errors in the prepended header data part, or if the parity bit(s) indicate(s) an error. An Errored Second (ES) is defined as any second in which an error is detected, and a Severely Errored Second (SES) is defined as a second in which the average error rate is greater than 1 per 1000 bits. The number of errors detected are monitored over a predefined period of time and if a predefined number of errors is exceeded then an Excessive Error Threshold (EET) condition is detected. The EET may be defined, for example, as more than 15 SES's or more than 150 ES's for a 15 minute period. Loss of Frame Alignment is detected when a number (e.g. 3) of consecutive prepended header data signals contain errors.

With regard to the predetermined pattern, the test apparatus 30, 30' is arranged to provide an "alarm" signal when the signal having that predetermined pattern is not present. In other words, if a "one" were to be detected in the signal received on the back-up circuit 27, this would indicate an error. In alternative embodiments of the present invention other forms of predetermined pattern are used.

The detection at monitor points 35 and 35' of the predetermined pattern generated by the pattern generators 41 and 41' indicates that the back-up circuit can be used for transmission of telecommunications traffic data if so required.

The pattern generators 41, 41' are controlled by the ISMNE 30 to apply or remove the predetermined pattern which is used to indicate that the back-up circuit is free of faults and thus available for use. When telecommunications traffic is switched to the back-up circuit by the ISMNE 30, the back-up circuit 27 becomes the primary circuit and the faulty primary circuit 26 becomes the back-up circuit. The pattern applied by the generators 41, 41' is restored on the originally faulty circuit 26 if the fault clears.

Figure 3:
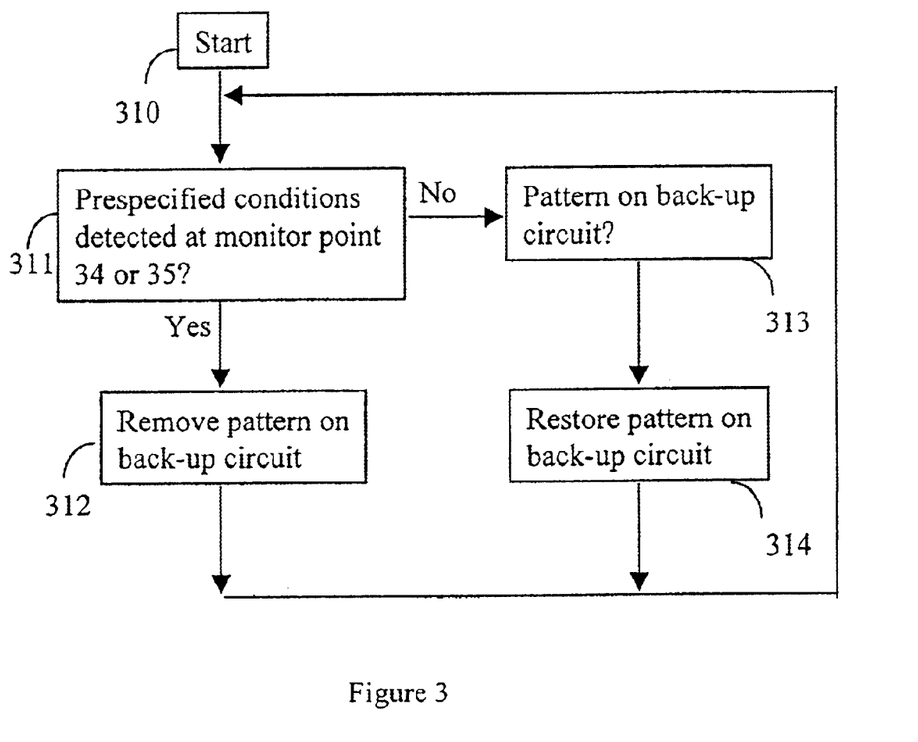
FIG. 3 is a flow chart showing the sequence of events showing how remote switching to a back-up circuit is inhibited under certain conditions.

Referring now to FIG. 3 together with FIG. 2. FIG. 3 is a flow chart showing the sequence of events which result in removal or restoration of the expected predetermined pattern from the back-up circuit 27. Monitor points 34, and 35 are continually monitored. If prespecified fault conditions are detected at either of these points at step 311 then the pattern generator 41 is caused to remove the expected predetermined pattern from the back-up circuit at step 312.

Figure 4:
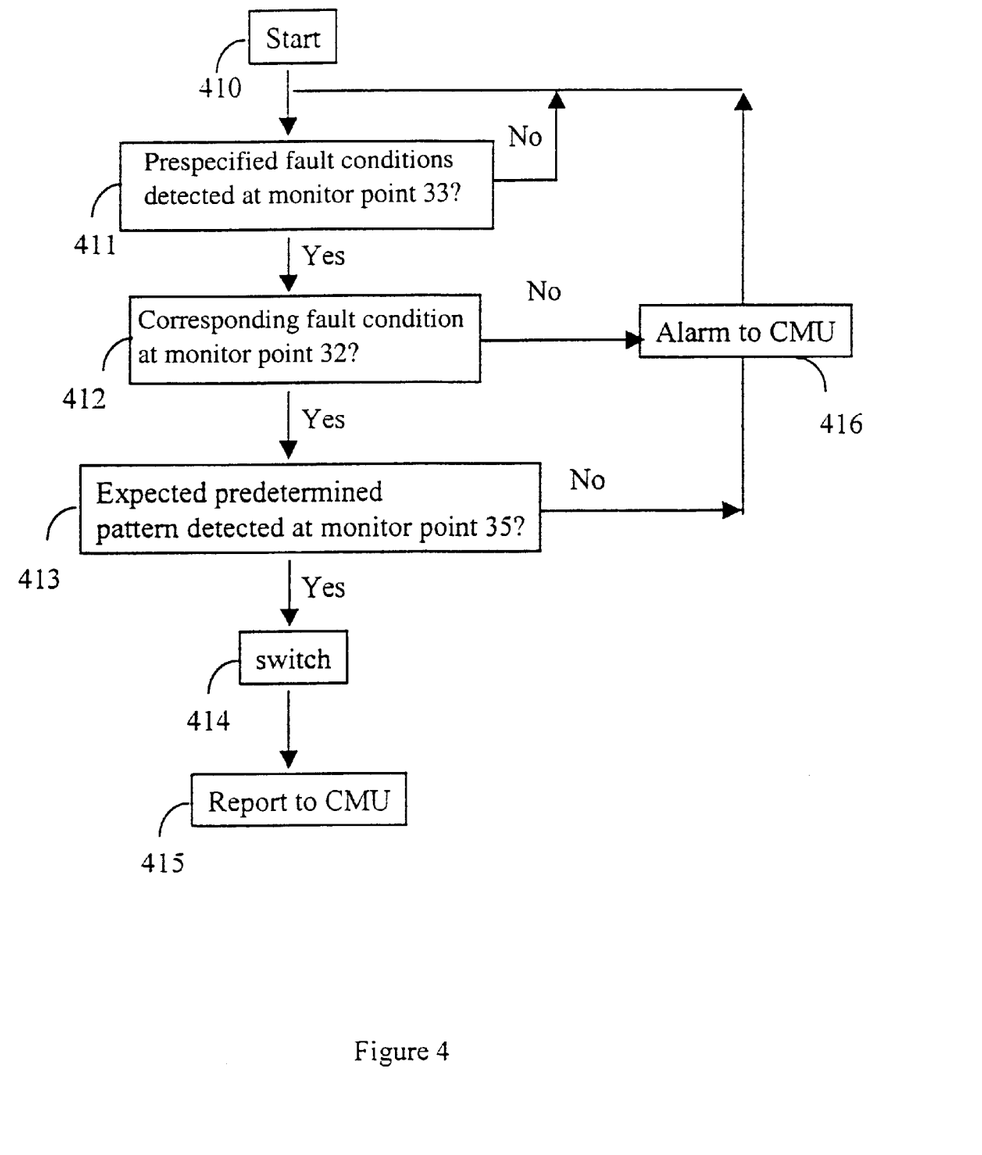
FIG. 4 is a flow chart showing the sequence of events which causes traffic to be switched to a back-up circuit as a result of a locally detected fault.
Figure 5:
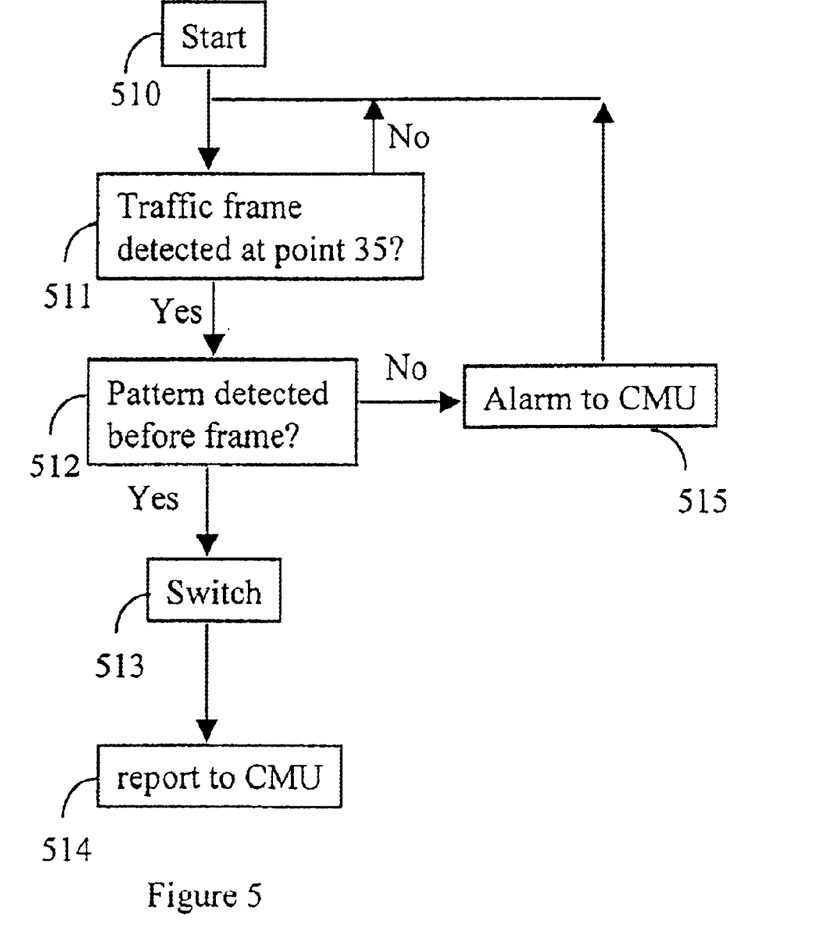
FIG. 5 is a flow chart showing the sequence of events which causes traffic to be switched to a back-up circuit as a result of another exchange having previously switched traffic to a back-up circuit.

Removal of the expected predetermined pattern inhibits the remote exchange 28' from switching traffic to the back-up circuit as shown in FIGS. 4 and 5 and discussed more fully below.

If any one of a number of prespecified fault conditions, namely LOS, LFA, AIS and EET, is detected at monitor point 34, 34' then this indicates that a fault has occurred which is external to the network 36 or the exchanges 28, 28', so switching traffic to the back-up circuit 27 would serve no useful purpose. If loss of the predetermined pattern is detected at monitor point 35, or any of fault conditions LOS, AIS and EET, then there is a fault on the back-up circuit 27. Again, switching traffic to the back-up circuit would serve no useful purpose.

If the conditions detected at step 311 at monitor points 34 or 35 are no longer any of the prespecified fault conditions, then a determination is made regarding whether or not a predetermined pattern is on the back-up circuit at step 313 and then the pattern generator 41 is caused to restore the predetermined pattern to the back-up circuit at step 314.

Referring now to FIG. 4 together with FIG. 2. FIG. 4 is a flow chart showing the sequence of events which causes traffic to be switched to the back-up circuit as a result of a locally detected fault. If one of a number of prespecified fault conditions is detected at monitor point 33 at step 411, then, to check whether the fault is likely to have resulted from the incoming traffic signal on the primary circuit 26 or from a faulty monitoring apparatus for the monitor point 34, it is ascertained whether there is a corresponding condition at monitor point 32 at step 412. If there is not, then it is assumed that monitor point 35 is in error, and an appropriate alarm is sent to the CMU 29 at step 416. If there are corresponding prespecified fault conditions at points 32 and 33 then traffic would normally be switched from the primary circuit to the back-up circuit and the pattern generator 41 may be switched to transmit the predetermined pattern on the primary circuit at step 414. However, if switching has been inhibited by the detection of the absence of the predetermined pattern on the back-up circuit, which is detected at monitor point 35 at step 413, then such switching will not take place.

If such a switch occurs, the original primary circuit 26 becomes the back-up circuit, and the original back-up circuit 27 becomes the primary circuit, with a corresponding change in the function of the monitor points 33 and 35. Clearly, if the fault is persistent then the prespecified fault condition will cause the pattern to be subsequently removed from the faulty circuit 26 as described above with reference to FIG. 3.

If there is a fault detected at point 32 only, then there is a fault in the switch 22, or monitor point 32 is in error, and an appropriate alarm is sent to the CMU. The prespecified fault conditions detected at monitor points 32 and 33 which cause traffic to switch to the back-up circuit in this embodiment are LOS, LFA, AIS and EET.

It will be appreciated that the monitoring at monitor point 33 must have the same capability as at monitor point 35 so that at any time either circuit 26 or circuit 27 can be the primary circuit.

FIG. 5 is a flow chart showing the sequence of events which causes traffic to be switched to a back-up circuit as a result of a remote exchange having previously switched traffic to a back-up circuit. If a traffic frame is detected at monitor point 35 at step 511 then the remote exchange 28' has switched traffic to the back-up circuit due to a fault detected by the ISMNE 30'. Normally, the expected predetermined pattern would be detected right up to the detection of the traffic frame, and it would not be possible for the ISMNE 30' to switch traffic from the primary circuit onto a faulty back-up circuit, i.e. at a time when the pattern generator 41' had been inhibited. However, a manual override facility at the exchange 28' might be incorrectly operated by network management personnel resulting in traffic being switched from the primary circuit to a faulty back-up circuit. Thus, step 512 provides a check on whether the pattern was detected immediately before the detection of the traffic on the back-up circuit, and, if not, then an appropriate alarm is sent to the CMU at step 515 and traffic is not switched to the back-up circuit. Otherwise, traffic is switched from the primary circuit to the back-up circuit and the pattern generator 41 is switched to transmit the predetermined pattern on the primary circuit at step 513.

In an alternative embodiment, the pattern generator 41 generates a different pattern from that generated by pattern generator 41', and it will be appreciated that the present invention requires only that the two directions of the back-up circuit are continuously monitored for a fault condition, and that this can be achieved with identical patterns or with different patterns in the two directions. In other words, the pattern generators are providing a pseudo traffic signal of known data content to exercise the back-up circuit continuously.

The following is a summary of how the status of the monitor point affects any action taken in this embodiment of the invention where:
1 indicates that a prespecified fault condition has been detected at that monitor point
0 indicates that a prespecified fault condition has not been detected at that monitor point
T indicates a traffic frame has been detected
P indicates the expected predetermined pattern has been detected
N indicates no signal has been detected
* indicates the status of that particular monitor point does not affect any action taken The last line of this summary is in respect of no signal (predetermined pattern) detected at monitor point 35 simultaneously with the pattern generator 41 generating the predetermined pattern. If no signal is detected at monitor point 35, this will cause the pattern generator 41 to be switched off, but in practice there will be a very small delay between this detection and the cessation of the pattern, and should a fault be detected and verified on the primary circuit during this brief period then the decision whether to switch from the primary circuit to the back-up circuit cannot be based on the state of the pattern generator alone, but must also include whether or not there is a received signal at monitor point 35.

| Monitor Points | | | | signal at 35 | expected predetermined pattern on? | Switch traffic to back-up circuit? | Send alarm to CMU? |
|---|---|---|---|---|---|---|---|
| 34 | 35 | 32 | 33 | | | | |
| * | 1 | * | * | * | | N | no |
| 1 | * | * | * | * | | N | no |
| 0 | 0 | * | * | T | Y | yes if expected predetermined pattern detected before traffic frame | if no expected predetermined pattern detected before traffic frame, switching inhibited at remote end => alarm |
| 0 | 0 | 0 | 0 | P or N | Y | no | |
| 0 | 0 | 1 | 0 | P or N | Y | no | conditions at 32 and 33 do not correspond |
| 0 | 0 | 0 | 1 | P or N | Y | no | conditions at 32 and 33 do not correspond |
| 0 | 0 | 1 | 1 | P | Y | yes | |
| 0 | 0 | 1 | 1 | N | Y | no | switching to protection circuit inhibited at remote exchange (due to prespecified fault conditions detected at 34' or 35') |

The embodiment described here uses a test apparatus which monitors a digital binary data signal in a packet switched telecommunications network, although it will be appreciated that the invention could be used in an analogue network, or in a digital network which is not packet switched.

What is claimed is:

1. A telecommunications network comprising a plurality of switching nodes interconnected by a plurality of circuits, each circuit comprising:
a respective forward transmission paths and
a respective reverse transmission path;
telecommunications traffic signals being transmitted by a switching node from an incoming circuit to another of said switching nodes on a primary circuit of said plurality of circuits;
each of said switching nodes including:
monitoring means for monitoring signals on said circuits, the monitoring means being responsive to detection of a fault on said primary circuit to cause said telecommunications traffic to be transmitted on a second of said circuits;
signal generating means for generating a first predetermined signal pattern on the forward transmission path of the second of said plurality of circuits; and
means to inhibit switching of traffic between said primary circuit and said second of said circuits, even in the event that a fault is detected on the primary circuit, if a second predetermined signal pattern is not detected on the reverse transmission path of the second circuit.

2. A network according to claim 1, in which the first predetermined signal pattern is identical to the second predetermined signal pattern.

3. A network according to claim 1, in which the first predetermined pattern is not transmitted if fault conditions are detected on the forward transmission path of the incoming circuit.

4. A network according to claim 1, in which the first predetermined pattern is not transmitted if fault conditions are detected on the reverse transmission path of the second circuit.

5. A network according to claim 3, in which the inhibiting means is further arranged to inhibit the switching of traffic between said primary circuit and said second of said circuits if the first predetermined pattern is not being transmitted.

6. A network according to claim 1, in which the monitoring means is responsive to detection of telecommunications traffic on said second circuit, to cause telecommunications traffic to be transmitted on said second of said circuits.

7. A network according to claim 6, in which the inhibiting means is arranged to inhibit switching of telecommunications traffic unless detected telecommunications traffic is preceded by said second predetermined pattern signal.

8. A network according to claim 1, in which the monitoring means is responsive to detection of said second predetermined pattern signal followed by telecommunications traffic on said second circuit, to cause telecommunications traffic to be transmitted on said second of said circuits.

9. A method for switching telecommunications traffic signals in a telecommunications network comprising a plurality of switching nodes interconnected by a plurality of circuits, each circuit comprising:
a respective forward transmission path; and
a respective reverse transmission path;
telecommunications traffic signals being transmitted by a switching node from an incoming circuit to another of said switching nodes on a primary circuit of said plurality of circuits; said method comprising steps of:
monitoring signals on said circuits, detection of a fault on said primary circuit causing said telecommunications traffic to be transmitted on a second of said circuits;
generating a first predetermined signal pattern on the forward transmission path of the second of said plurality of circuits; and
inhibiting the switching of traffic between said primary circuit and said second of said circuits, even in the event that a fault is detected on the primary circuit, if a second predetermined signal pattern is not detected on the reverse transmission path of the second circuit.

10. A method according to claim 9, in which the first predetermined signal pattern is identical to the second predetermined signal pattern.

11. A method according to claim 9, in which the first predetermined pattern is not transmitted if fault conditions are detected on the forward transmission path of the incoming circuit.

12. A method according to claim 9, in which the first predetermined pattern is not transmitted if fault conditions are detected on the reverse transmission path of the second circuit.

13. A method according to claim 11, in which the switching of traffic between said primary circuit and said second of said circuits is inhibited if the first predetermined pattern is not being transmitted.

14. A method according to claim 9, in which detection of telecommunications traffic on said second circuit causes telecommunications traffic to be transmitted on said second circuit.

15. A method according to claim 14, in which switching of telecommunications traffic is inhibited unless detected telecommunications traffic is preceded by said second predetermined pattern signal.

16. A method according to claim 9, in which detection of said second predetermined pattern signal followed by telecommunications traffic on said second circuit causes telecommunications traffic to be transmitted on said second of said circuits.

17. A method of restoration control in a communications network in which at least some primary circuits are associated with respective back-up circuits, the method comprising the steps of:
continuously monitoring both ends of a back-up circuit for the presence of a fault condition, and
while a fault condition is detected at at least one of said ends, preventing, at said end, the switching of traffic from the associated primary circuit to the back-up circuit even in the event that a fault condition is detected on the primary circuit.

18. A method as claimed in claim 17, wherein the step of continuously monitoring both ends of a back-up circuit for the presence of a fault condition comprises continuously monitoring said ends for the correct receipt of a test signal, and, while the correct receipt of a test signal is not detected at a said end, preventing, at said end, the switching of traffic from the associated primary circuit to the back-up circuit.

19. A method as claimed in claim 18, wherein the test signal used for one direction of the back-up circuit is identical to the test signal used for the other direction of the back-up circuit.

20. A method as claimed in claim 17, wherein the step of preventing the switching of traffic from the associated primary circuit to the backup circuit is also performed upon detection of a fault condition relating to an incoming traffic signal in respect of that primary circuit.

21. A telecommunications network comprising a plurality of switching nodes interconnected by a plurality of circuits, each circuit comprising:
a respective forward transmission path; and
a respective reverse transmission path;
telecommunications traffic signals being transmitted by a switching node from an incoming circuit to another of said switching nodes on a primary circuit of said plurality of circuits;
each of said switching nodes including:
monitoring means for monitoring signals on said circuits, the monitoring means being responsive to detection of a fault on said primary circuit to cause said telecommunications traffic to be transmitted on a second of said circuits;
signal generating means for generating a first predetermined signal pattern on the forward transmission path of the second of said plurality of circuits; and
means to inhibit switching of traffic between said primary circuit and said second of said circuits, even in the event that a fault is detected on the primary circuit, if a fault is deemed to be present on the second of said circuits as a result of failing to detect a second predetermined signal pattern on the reverse path of the second of said circuits.

22. A method for switching telecommunications traffic signals in a telecommunications network comprising a plurality of switching nodes interconnected by a plurality of circuits, each circuit comprising:
a respective forward transmission path; and
a respective reverse transmission path;
telecommunications traffic signals being transmitted by a switching node from an incoming circuit to another of said switching nodes on a primary circuit of said plurality of circuits; said method comprising steps of:
monitoring signals on said circuits, detection of a fault on said primary circuit causing said telecommunications traffic to be transmitted on a second of said circuits;
generating a first predetermined signal pattern on the forward transmission path of the second of said plurality of circuits; and
inhibiting the switching of traffic between said primary circuit and said second of said circuits, even in the event that a fault is detected on the primary circuit, if a fault is deemed to be present on the second of said circuits as a result of failing to detect a second predetermined signal pattern on the reverse path of the second of said circuits.

23. A method of controlling a communications network having a primary circuit and a back-up circuit, the method comprising:
monitoring for a fault condition on the primary circuit;
determining that communications traffic carried by the primary circuit should be switched to the back-up circuit upon the detection of a fault condition on the primary circuit; and
overriding the determination to switch communications traffic from the primary circuit to the back-up circuit as a result of a detection of a fault condition on the back-up circuit even in the event of the detection of the fault condition on the primary circuit.

24. A method of controlling a communications network having a primary circuit and a back-up circuit, the method comprising:
detecting a fault condition on the primary circuit;
determining that communications traffic carried on the primary circuit should be switched to the back-up circuit as a result of the detection of the fault condition on the primary circuit;
detecting a fault condition on the back-up circuit; and
overriding the determination that communications traffic should be switched from the primary circuit to the back-up circuit as a result of the detection of the fault condition on the back-up circuit.

25. A telecommunications network comprising:
a primary circuit for carrying communications traffic;
a back-up circuit for carrying communications traffic; and
a switching node which monitors for the detection of a fault condition on the primary circuit and the back-up circuit, determines that communications traffic carried by the primary circuit should be switched to the back-up circuit upon the detection of a fault condition in the primary circuit, and overrides the determination that communications traffic should be switched from the primary circuit to the back-up circuit as a result of a detection of a fault condition on the secondary circuit even in the event of the detection of the fault condition on the primary circuit.

26. A telecommunications network comprising:
a primary circuit for carrying communications traffic;
a back-up circuit for carrying communications traffic; and
a switching node which detects a fault condition on the primary circuit, determines that communications traffic should be switched from the primary circuit to the back-up circuit as a result of the detection of the fault condition on the primary circuit, detects a fault condition on the back-up circuit, and overrides the determination to switch the communications traffic from the primary circuit to the back-up circuit as a result of the detection of the fault condition on the back-up circuit.

* * * * *